(12) United States Patent
Nomura et al.

(10) Patent No.: US 12,330,340 B2
(45) Date of Patent: Jun. 17, 2025

(54) METHOD OF MANUFACTURING SEMICONDUCTOR WAFERS

(71) Applicant: DENSO CORPORATION, Kariya (JP)

(72) Inventors: Sodai Nomura, Kariya (JP); Tomoki Kawazu, Kariya (JP); Bahman Soltani, Kariya (JP); Yutaro Isshiki, Kariya (JP); Nobuyuki Nunome, Kariya (JP); Shiro Okita, Kariya (JP); Riku Onishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 256 days.

(21) Appl. No.: 17/900,950

(22) Filed: Sep. 1, 2022

(65) Prior Publication Data

US 2023/0073379 A1    Mar. 9, 2023

(30) Foreign Application Priority Data

Sep. 3, 2021  (JP) ................. 2021-143929

(51) Int. Cl.
B28D 5/00       (2006.01)
B23K 26/53      (2014.01)
B23K 103/00     (2006.01)

(52) U.S. Cl.
CPC ............ B28D 5/0011 (2013.01); B23K 26/53 (2015.10); B28D 5/0052 (2013.01); *B23K 2103/56* (2018.08)

(58) Field of Classification Search
CPC .... B28D 5/0011; B23K 26/53; B23K 103/56; B25D 5/0052
See application file for complete search history.

(56) References Cited

U.S. PATENT DOCUMENTS

| | | |
|---|---|---|
| 2016/0074960 A1 | 3/2016 | Hirata et al. |
| 2016/0228983 A1 | 8/2016 | Hirata et al. |
| 2018/0154543 A1 | 6/2018 | Hirata |
| 2018/0354067 A1 | 12/2018 | Iizuka et al. |
| 2020/0075414 A1 | 3/2020 | Sekiya |
| 2020/0223015 A1 | 7/2020 | Sekiya |
| 2020/0254650 A1* | 8/2020 | Swoboda ........... B23K 26/0006 |
| 2021/0129380 A1 | 5/2021 | Naya et al. |

(Continued)

FOREIGN PATENT DOCUMENTS

| | | |
|---|---|---|
| EP | 3819094 A1 | 5/2021 |
| JP | 2016-116126 A | 6/2016 |

(Continued)

*Primary Examiner* — Omar Flores Sanchez
(74) *Attorney, Agent, or Firm* — Harness, Dickey & Pierce, P.L.C.

(57) ABSTRACT

A manufacturing method of semiconductor wafers includes preparing a ingot having a first major surface and a second major surface in a back side of the first major surface, a peeling layer being formed in the ingot along the first major surface; and applying a load to the ingot from outside thereof with respect to a surface direction along the first major surface such that a moment with a supporting point which is a first end of the ingot in the surface direction acts on the ingot, thereby peeling a wafer precursor from the ingot. Also, a dynamic force may be applied to the ingot such that a tensile stress along an ingot thickness direction acts on an entire area of the ingot in the surface direction, thereby peeling the wafer precursor from the ingot.

10 Claims, 4 Drawing Sheets

(56) References Cited

U.S. PATENT DOCUMENTS

| | | | |
|---|---|---|---|
| 2021/0221026 A1* | 7/2021 | Nomaru | B23K 26/0006 |
| 2022/0126395 A1 | 4/2022 | Donofrio et al. | |
| 2022/0281137 A1* | 9/2022 | Kunimoto | B26F 3/00 |
| 2022/0315472 A1* | 10/2022 | Kanno | B23K 26/0821 |
| 2024/0149494 A1* | 5/2024 | Lu | B28D 5/0011 |

FOREIGN PATENT DOCUMENTS

| | | |
|---|---|---|
| JP | 2016146448 A | 8/2016 |
| JP | 2018093106 A | 6/2018 |
| JP | 2020-035821 A | 3/2020 |
| JP | 6678522 B2 | 4/2020 |
| JP | 2020-113664 A | 7/2020 |
| JP | 6904793 B2 | 7/2021 |
| WO | WO-2020/136624 A2 | 7/2020 |

* cited by examiner

METHOD OF MANUFACTURING SEMICONDUCTOR WAFERS

CROSS-REFERENCE TO RELATED APPLICATION

This application is based on and claims the benefit of priority from earlier Japanese Patent Application No. 2021-143929 filed Sep. 3, 2021, the description of which is incorporated herein by reference.

BACKGROUND

Technical Field

The present disclosure relates to a method of manufacturing semiconductor wafers.

Description of the Related Art

For example, conventional wafer manufacturing method includes a peeling surface forming step and a wafer peeling step. The peeling surface forming step forms a peeling surface composed of a modified layer and cracks. Specifically, in the peeling surface forming step, a laser beam is radiated to a silicon ingot with the focusing point positioned at a depth corresponding to a wafer thickness from the first surface of the ingot, while relatively moving the silicon ingot and the focusing point to make the adjacent focusing points mutually overlap.

SUMMARY

A method of manufacturing semiconductor wafers according to a first aspect of the present disclosure includes steps of: preparing an ingot having a first major surface and a second major surface in a back side of the first major surface, a peeling layer being formed in the ingot along the first major surface; and applying a load to the ingot from outside thereof with respect to a surface direction along the first major surface such that a moment with a supporting point which is a first end of the ingot in the surface direction acts on the ingot, and/or applying a dynamic force to the ingot such that a tensile stress along an ingot thickness direction acts on an entire area of the ingot in the surface direction, the ingot thickness direction defining a thickness of the ingot, connecting the first major surface and the second major surface and being parallel to a center axis of the ingot, thereby peeling a wafer precursor from the ingot, the wafer precursor being formed in a layer-shape between the first major surface and the peeling layer.

DETAILED DESCRIPTION OF THE PREFERRED EMBODIMENTS

A wafer manufacturing method according to Japanese Patent No. 6678522 includes a peeling surface forming step and a wafer peeling step. The peeling surface forming step forms a peeling surface composed of a modified layer and cracks. Specifically, in the peeling surface forming step, a laser beam is radiated to a silicon ingot with the focusing point positioned at a depth corresponding to a wafer thickness from the first surface of the ingot, while relatively moving the silicon ingot and the focusing point to make the adjacent focusing points mutually overlap. The wafer peeling step includes a table fixing step to fix a second surface of the ingot on the table, a pad fixing step to fix a pad on the first surface of the ingot and a peeling step to peel a part of the ingot with a peeling surface as the boundary surface. In the peeling step, a moment force acts on the ingot where one end of the pad is the working point and the other end is the supporting point, thereby peeling the part of the ingot with the peeling surface as the boundary surface.

According to this type of the method for manufacturing the semiconductor wafer, a processing quality and a processing ease are required to be improved in the peeling step where wafers are peeled from the silicon ingot. Specifically, for example, surface roughness on the peeling cross-section which is a wafer surface produced by the peeling of the peeling surface is suppressed, whereby a processing margin or a processing time of a griding step and a polishing step can be reduced, thus improving the manufacturing yield. Alternatively, the peeling step may be changed to be in a low-load condition, thereby improving the processing ease.

Embodiments

Hereinafter, an embodiment of the present disclosure will be described with reference to the drawings. For various modifications which are applicable for one embodiment, if these modifications are inserted into a series of explanations related to the embodiment, understanding of the embodiment may be disturbed by these modifications. Hence, the modifications are not inserted into the series of explanations and will be described later.

(Outline of Manufacturing Method)

Figure 1:
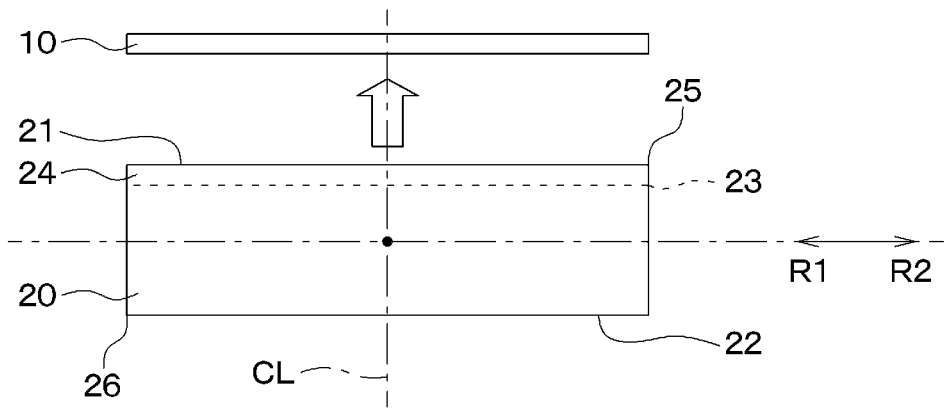
FIG. 1 is an overall diagram showing a manufacturing method of a semiconductor wafer according to an embodiment of the present disclosure.

Referring to FIG. 1, a manufacturing method of a semiconductor wafer 10 according to the present embodiment, a so-called laser slicing technique is utilized to obtain the semiconductor wafer 10 from an ingot 20 made of semiconductor such as SiC (i.e. silicon carbide). The ingot 20 has a first major surface 21 and a second major surface 22 as a pair of major surfaces. The major surface is defined as a surface of the ingot 20 orthogonal to an ingot thickness direction that defines the thickness of the ingot 20. The ingot thickness direction is a direction connecting the first major surface 21 and the second major surface 22 and a direction being parallel to a center axis CL of the ingot 20. The first surface 21 is one surface in the pair of major surfaces of the ingot 20. The second surface 22 is the other surface in the pair of major surfaces of the ingot 20, that is, back side surface of the first major surface 21. Specifically, the present manufacturing method includes a peeling layer forming step and a peeling step.

In the peeling layer forming step, a laser beam is radiated to the ingot 20 from the first major surface 21 side, thereby forming a peeling layer 23 in the vicinity of the first major surface in the ingot 20. The peeling layer 23 corresponds to a peeling surface in the above-mentioned patent literature and includes a modification part and cracks. The modification part is a portion where semiconductor material constituting the ingot 20 is modified by the laser radiation. Specifically, for example, in the case where the ingot 20 is made of single crystal of SiC semiconductor, the SiC is separated into Si and C by the laser radiation in the modification part. The peeling layer 23 is formed along the first major surface 21. Hereinafter, a direction along the first major surface 21 is referred to as surface direction. The surface direction may be any direction which crosses the center axis CL (i.e. typically crosses at a right angle). The surface direction includes a radial direction. The radial direction refers to a direction along a virtual linear line which passes through a cross point between any one of virtual planes intersecting the center axis CL (i.e. typically crosses at right angle) and the center axis CL, and being parallel to any one of virtual planes. Typically, the radial direction refers to, in the ingot 20 having substantially cylindrical shape, a direction of the radius of the circular cross-section of the ingot 20 on the virtual plane. In the radial directions, a direction towards the center axis CL is referred to as first radial direction R1 and a direction away from the center axis CL is referred to as a second radial direction R2. The laser beam to be radiated to the ingot 20 has a wavelength for which the ingot 20 has transparency (i.e. transparency for a depth corresponding to the thickness of the peeling layer 23 or the thickness of the semiconductor wafer 10). For the laser beam, a pulse laser beam can be used. The laser wavelength may be, for example, 1028 nm, 1064 nm, 1099 nm or the like. Note that the peeling layer 23 formed by the laser radiation and the peeling layer forming step for forming the peeling layer 23 may be those publicly known or commonly known at the time of filing of this application (e.g. above-described patent literature, Japanese Patent No. 6678522). Hence, further explanation for the peeling layer 23 and the peeling layer forming step will be omitted.

With the peeling layer forming step, the ingot 20 having the peeling layer 23 and a wafer precursor 24 is prepared. The wafer precursor 24 is a thin-layered portion provided between the first major surface 21 and the peeling layer 23. The wafer precursor 24 is separated from the ingot 20 by the peeling step, then becomes the semiconductor wafer 10. The wafer precursor 24 has substantially constant thickness in the surface direction. In the peeling step, the wafer precursor 24 is peeled from the ingot 20, thereby obtaining the semiconductor wafer 10. With the griding step and the polishing step, the major surface of the obtained semiconductor wafer 10 is planarized and smoothened.

First Embodiment

Hereinafter, a manufacturing method according to the first embodiment will be described with reference to FIG. 2 in addition to FIG. 1. According to the present embodiment, in the peeling step, a load is applied to the ingot 20 from outside thereof with respect to the surface direction such that a moment force acts on the ingot 20 where a first end 25 which is one end of the ingot 20 in the surface direction is the supporting point PP. Note that the other end of the ingot 20 in the surface direction is referred to as a second end 26.

Figure 2:
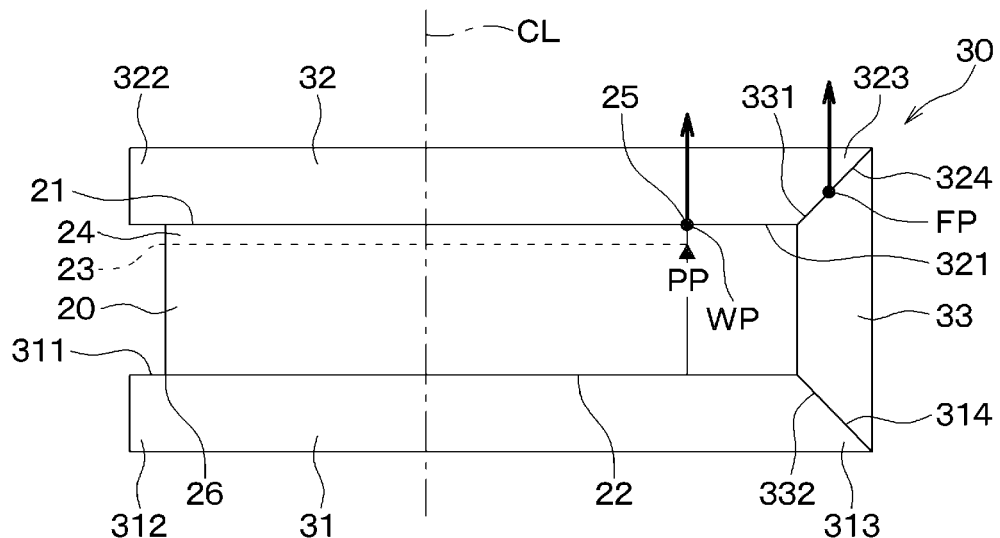
FIG. 2 is an overall diagram showing a manufacturing method of a semiconductor wafer according to an embodiment of the present disclosure.

Specifically, the peeling step according to the present embodiment is performed using a peeling apparatus 30 shown in FIG. 2. Referring to FIG. 2, the peeling apparatus 30 has a supporting table 31, a peeling pad 32 and a driving member 33.

The supporting table 31 is provided to support the ingot 20 from underneath. Specifically, the supporting table 31 includes many suction holes (not shown) opened at a supporting suction surface 311 as an upper surface of the supporting table 31, and is configured to suck a second major surface 22 of the ingot 20 on the supporting suction surface 311 by the negative air pressure. The supporting table 31 is provided with a first table end 312 and a second table end 313 as the both ends thereof in the surface direction. The second table end 313 as an end portion in the one end side in the surface direction (i.e. right side in FIG. 2) includes a table end face 314. The table end face 314 is formed as an inclined surface rising towards the first radial direction R1. In other words, as shown in FIG. 2, the supporting table 31 is formed in a trapezoidal shape where the lower base is longer than the upper base in a side view.

The peeling pad 32 is provided above the supporting table 31 to be capable of approaching and separating freely with respect to the supporting table 31. The peeling pad 32 includes many suction holes (not shown) opened at a pad suction surface 321 as a bottom surface of the peeling pad 32, and is configured to suck the first major surface 21 of the ingot 20 on the pad suction surface 321 by the negative air pressure. The peeling pad 32 includes a first pad end 322 and a second pad end 323 as the both ends thereof in the surface direction. The second pad end 323 as an end portion in the one end side in the surface direction (i.e. right side in FIG. 2) includes pad end face 324. The pad end face 324 is formed as an inclined surface rising towards the second radial direction R2. In other words, as shown in FIG. 2, the peeling pad 32 is formed in a trapezoidal shape where the lower base is shorter than the upper base in a side view. The pad end face 324 is provided at a portion corresponding to the table end face 314 (i.e. right above).

The first major surface 21 is fixed to the peeling pad 32 by the adsorption and the second major surface 22 is fixed to the supporting table 31, whereby the ingot 20 is supported between the supporting table 31 and the peeling pad 32. Hereinafter, this state is referred to as supported state. The driving member 33 applies a force to at least either the supporting table 31 or the peeling pad 32 to make the supporting table 31 and the peeling pad 32 relatively move in the ingot thickness direction. Specifically, the driving member 33 includes a first driving end face 331 and a second driving end face 332. The first driving end face 331 is formed as an inclined surface rising towards the second radial direction R2. That is, the first driving end face 331 is provided to be in parallel to the pad end face 324. The second driving end face 332 is formed as an inclined surface rising towards the first radial direction R1. That is, the second driving end face 332 is provided to be in parallel to the table end face 314. The driving member 33 is provided such that the first driving end face 331 is in contact with the pad end face 324 under the supported state and the second driving end face 332 is in contact with the table end face 314. In other words, as shown in FIG. 2, the driving member 33 is formed in a shape of a trapezoid where the lower base is longer than the upper base, rotated by 90 degrees in the anti-clockwise direction. Then, the driving member 33 is configured to be driven by a driving means (not shown) in a direction along the ingot thickness direction and/or the first radial direction as a direction approaching the ingot. The driving member 33 is provided to be driven upward and/or in the first radial direction R1 such that a moment force, where the second pad end 323 is the force point FP, the first end 25 is the supporting point PP and the working point WP, is applied to the ingot 20.

The peeling step in which the wafer precursor 24 is peeled from the ingot 20 includes a table fixing step, a supporting step and a peeling force application step. In the table fixing step, the second major surface 22 is sucked on the supporting suction surface 311, thereby fixing the ingot 20 on the supporting table 31. In the supporting step, the first major surface 21 is sucked on the pad suction surface 321 to fix the ingot 20 on the peeling pad 32, thereby producing the supported state. In the peeling force application step, a static load is applied, where the force point FP is at the second pad end 323 as an end portion of the peeling pad 32 positioned in one side in the surface direction, such that a moment force acts on the ingot 20 in which the supporting point PP is the first end 25 positioned in one side in the surface direction. Specifically, according to the peeling force application step, the driving member 33 is driven upward and/or in the first radial direction R1 under the supported state, whereby the second pad end 323 is pressed upward along the ingot thickness direction. Thus, the wafer precursor 24 which is a part of the ingot 20 can be peeled from the ingot 20 with the peeling layer 23 as the boundary surface.

Figure 3:
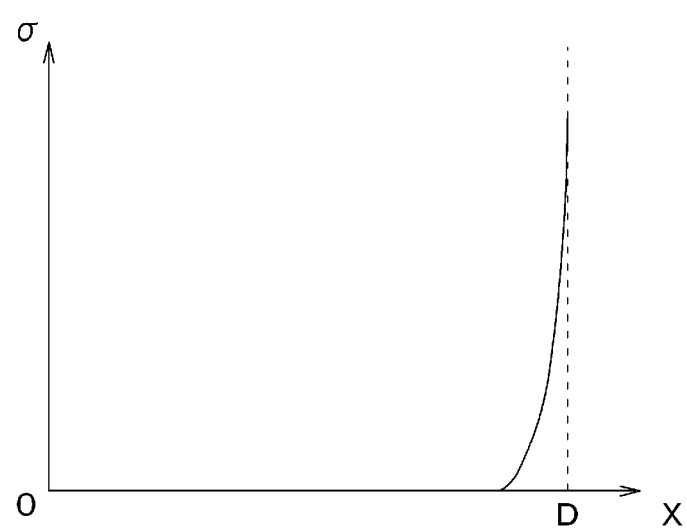
FIG. 3 is a diagram showing a stress distribution inside an ingot according to the manufacturing method shown in FIG. 2.

FIG. 3 shows a distribution of an internal stress of the ingot 20 immediately after the application of the static load in the peeling force application step, that is, immediately before a fracture of the wafer precursor 24 in the peeling layer 23 occurs as a begging of the peeling thereof. In FIG. 3, the vertical axis a indicates an amount of tensile stress. The horizontal axis X indicates position in the surface direction relative to the second end 26 as the origin. The value D in the horizontal axis X indicates a diameter of the ingot 20. That is, X=0 indicates the second end 26 and X=D indicates the first end 25. Note that the internal stress distribution shown in FIG. 3 is taken when the driving member 33 shown in FIG. 2 is driven upward. As shown in FIG. 3, according to the peeling method of the present embodiment, the stress is concentrated at the first end 25 and the area where the tensile stress is applied is a very narrow area in the vicinity of the first end 25. Then, in the peeling layer 23, fine fractures occur from the first end 25 where the tensile stress is concentrated, and the fractures instantly propagate through the entire peeling layer 23. That is, fragile fractures occur in the peeling layer 23, thereby causing peeling in the entire peeling layer 23.

Figure 4:
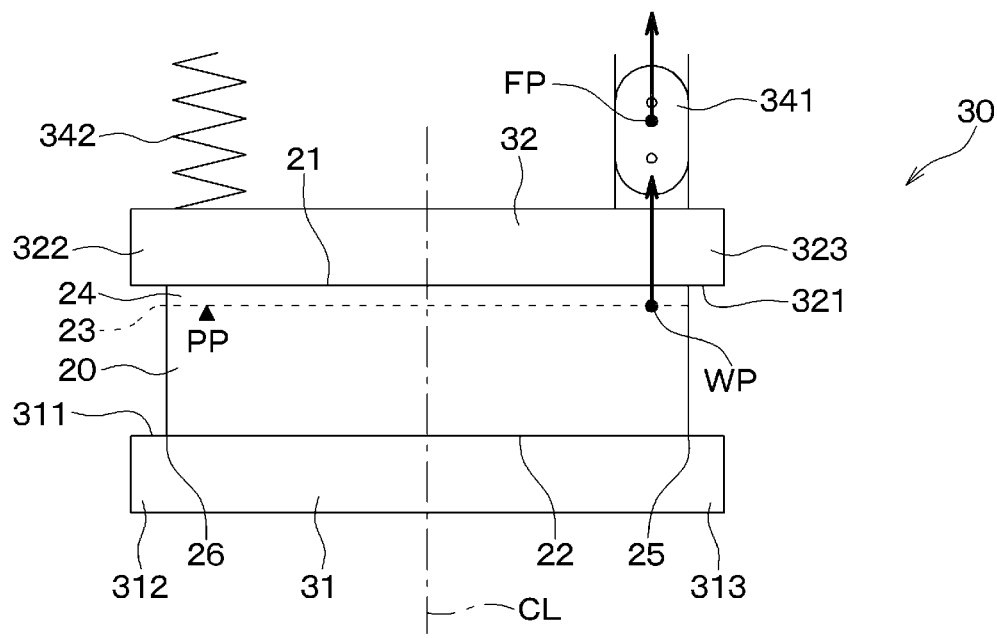
FIG. 4 is an overall diagram showing a manufacturing method of a semiconductor wafer according to a comparative example.

FIG. 4 illustrates a configuration modified from that shown in FIG. 2 and illustrates an outline of a peeling method described in the above patent literature of Japanese Patent No. 6678522 as a comparative example. As shown in FIG. 4, according to the comparative example, the supporting table 31 and the peeling pad 32 are formed in a simple plate shape. Further, according to the comparative example, a first support member 341 and a second support member 342 as an approaching/separating means which causes the peeling pad 32 to approach or separate to/from the supporting table 31. The first supporting member 341 is a coupling mechanism capable of being bent, and fixed to an upper surface of the second pad end 323 which is one end of the peeling pad 32. The second support member 342 is configured as a spring and the lower end thereof is fixed to the upper surface of the first pad end 322 as the other end of the peeling pad 32.

As shown in FIG. 4, when a force is applied upwardly to the second pad end 323 by the first support member 341 in the supported state, the second support member 342 configured of a spring is extended. Then, a moment force acts on the ingot 20 where the working point WP is a position in the vicinity of the first end 25 and immediately below the first support member 341, and the supporting point PP is a position in the vicinity of the second end 26 and immediately below the second support member 34.

Figure 5:
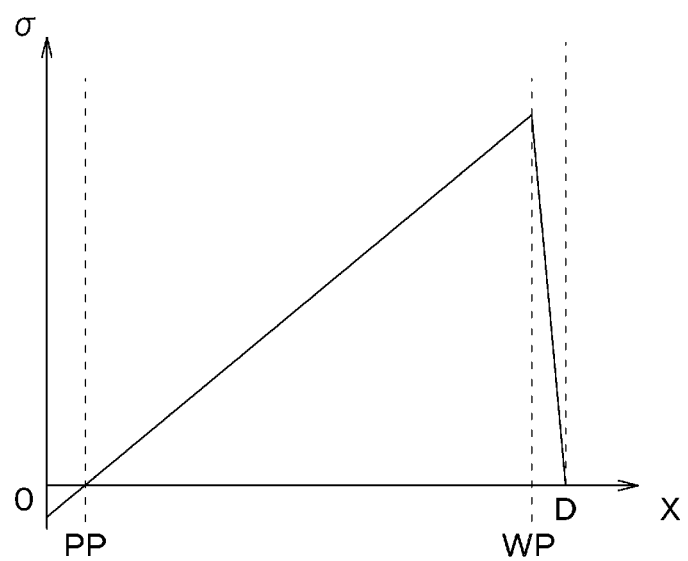
FIG. 5 is a diagram showing a stress distribution inside an ingot according to the manufacturing method shown in FIG. 4.

FIG. 5 shows a distribution of the internal stress in the ingot 20 according to a comparative example. As shown in FIGS. 4 and 5, in the comparative example, the tensile stress becomes maximum at the working point WP positioned at further inside than the position of the first end 25, decreases in monotone manner towards the supporting point PP and becomes 0 at the supporting point PP. Then, a compressive stress occurs between the supporting point PP and the second end 26.

Thus, according to the comparative example, stress cannot be concentrated on an edge portion of the ingot 20, that is, the peeling layer in the surface direction (i.e. first end 25 in the example shown in FIG. 5). Hence, compared to the present embodiment, a significantly larger load than that of the present embodiment is required in order to generate peeling with the peeling layer as the boundary surface, that is, fracture of the ingot 20. Further, since the load is applied onto the peeling layer 23 in a wider area, location of cracks for the peeling is uncertain such that a partial non-peeled portion or a breakage sometimes occurs on the acquired semiconductor wafer 10 (i.e. see FIG. 1). Moreover, due to a rough peeled cross-section, a problem arises that processing margin of the grinding or the polishing becomes larger. Therefore, according to the comparative example, for achieving low load application or improving the manufacturing yield, improvement is necessary.

However, according to the present embodiment, the force point FP is set to be in the first end 25 side in the surface direction and outside the ingot 20 such that the supporting point PP and the working point WP are at the first end 25 in the ingot 20. Thus, stress can be concentrated on an edge portion of the ingot 20, that is, the peeling layer in the surface direction (i.e. first end 25). Hence, the peeling load can be lowered. Also, the processing ease can be improved. Moreover, since the peeling occurs on the entire surface of the peeling layer 23, the manufacturing yield is improved.

Second Embodiment

Hereinafter, the manufacturing method according to the second embodiment will be described. For the explanation of the second embodiment below, configurations different from those in the first embodiment will be mainly described. In the first and second embodiments, the same reference numbers are applied to mutually the same or equivalent portions. Hence, in the explanation of the second embodiment below, for constituents having the same reference numbers as those in the first embodiment, explanations of the first embodiment will be appropriately applied as long as technical inconsistency or any additional explanations are not present. The same applies to the third embodiment and other embodiments will be described later.

Figure 6:
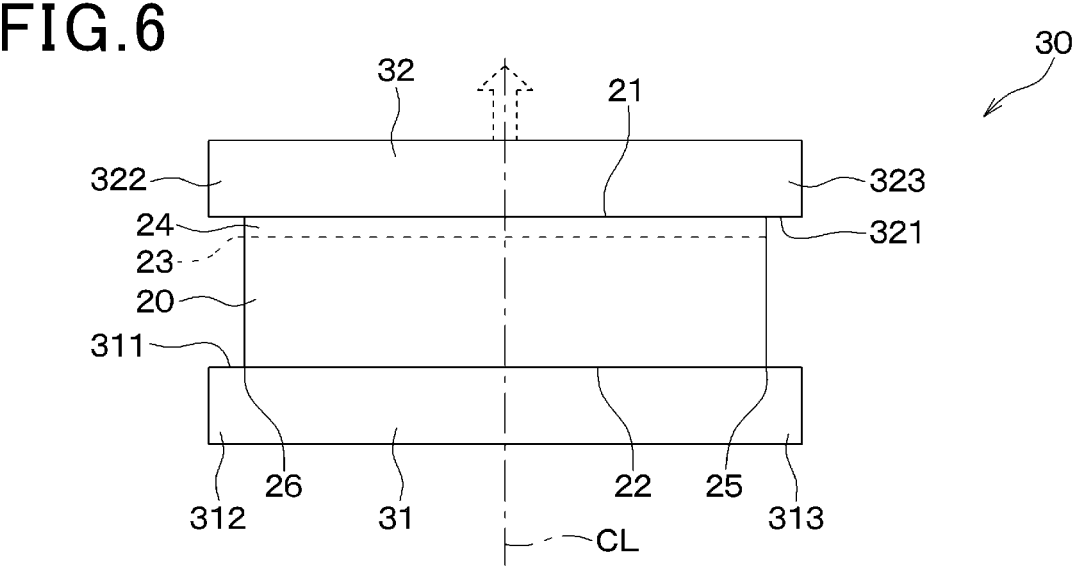
FIG. 6 is an overall diagram showing a manufacturing method of a semiconductor wafer according to another embodiment of the present disclosure.
Figure 7:
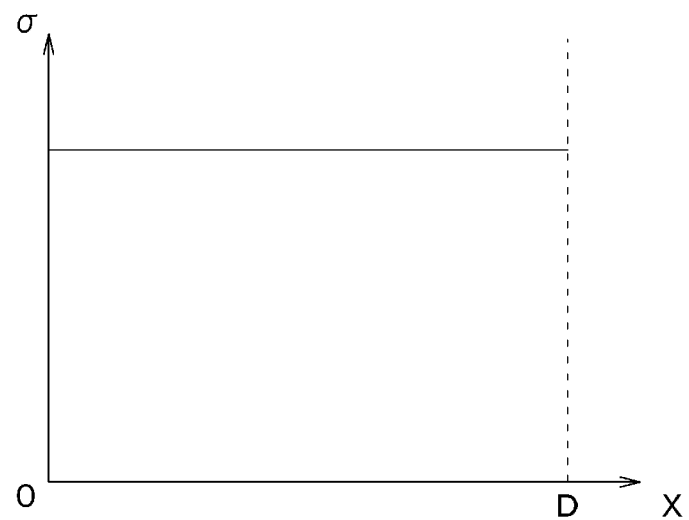
FIG. 7 is a diagram showing a stress distribution inside an ingot according to the manufacturing method shown in FIG. 6.

According to the present embodiment, in the peeling step, as shown in FIGS. 6 and 7, a dynamic force is applied to the ingot 20 such that tensile stress along the ingot thickness direction acts on the entire area of the ingot 20 in the surface direction. Specifically, in the peeling force application step of the present embodiment, dynamic force is applied to the supporting table 31 and/or the peeling pad 32 in a direction where the supporting table 31 and the peeling pad 32 are mutually separated away. Note that the dynamic force refers to a contrary concept of a static force acting without variation in a period having a certain duration (not instantaneous), but a force acting instantaneously or an impact force acting in a relative short period (e.g. pulse-like force).

Also, according to the present embodiment, the peeling process in which the wafer precursor 24 is peeled from the ingot 20 includes a table fixing step, a supporting step and a peeling force application step. The table fixing step and the supporting step are the same as those in the above-described first embodiment. With the table fixing step and the supporting step, a supported state is produced in which the ingot 20 is fixed to the supporting table 31 and the peeling pad 32. As shown in FIG. 6, the peeling force application step according to the present embodiment applies dynamic force to the supporting table 31 and/or the peeling pad 32 such that the instantaneous tensile stress due to the impact is applied to the ingot 20. Specifically, for example, upward impact may be applied to the peeling pad 32 or downward impact may be applied to peeling pad 32. Alternatively, the table end face 314, the pad end face 324 and a pair of driving members 33 shown in FIG. 2 may be provided at the both sides in the surface direction (i.e. both left and right sides of FIG. 6), impact in the first radial direction R1 approaching the center axis CL can be applied to the pair of driving members 33. Thus, the wafer precursor 24 as a part of the ingot 20 can be peeled with the peeling layer 23 as the boundary surface.

As shown in FIG. 7, according to the peeling method of the present embodiment, the tensile stress instantaneously and uniformly acts on the entire surface in the surface direction of the ingot 20, that is the peeling layer 23. Thus, peeling occurs on the entire surface of the peeling layer 23. Also, the surface roughness of the peeled cross-section can be reduced. Hence, according to the present embodiment, the processing ease and the manufacturing yield can be improved.

Third Embodiment

Figure 8:
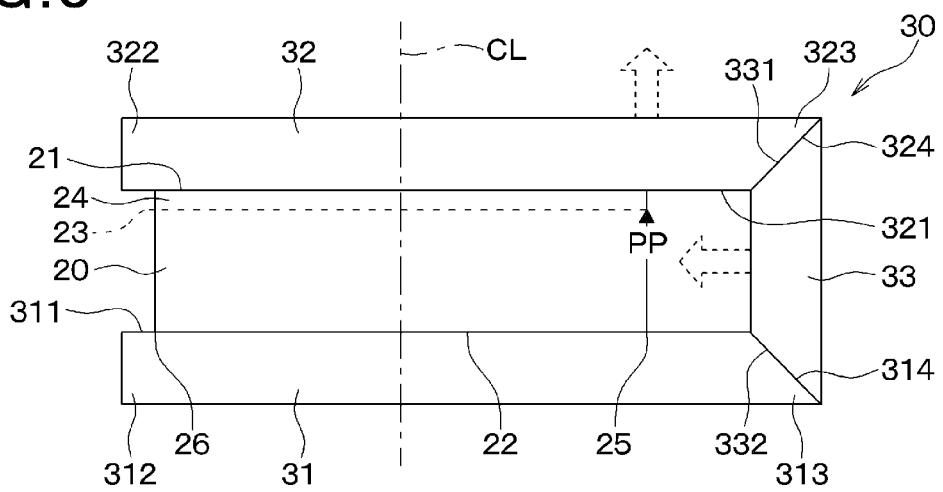
FIG. 8 is an overall diagram showing a manufacturing method of a semiconductor wafer according to yet another embodiment of the present disclosure.

Hereinafter, a manufacturing method according to the third embodiment will be described. The present embodiment corresponds to a combination of the above-described first embodiment and the second embodiment. Specifically, also in the present embodiment, the peeling step in which the wafer precursor 24 is peeled from the ingot 20 includes a table fixing step, a supporting step and a peeling force application step. The table fixing step and the supporting step are the same as those in the first embodiment. With the table fixing step and the supporting step, a supported state in which the ingot 20 is fixed to the supporting table 31 and the peeling pad 32 is produced. Then, as shown in FIG. 8, in the peeling force application step, a dynamic force with the force point FP as the second pad end 323, that is, an impact force, is applied such that a moment force where the supporting point PP is positioned at the first end, and the tensile stress act on the ingot 20. Specifically, for example, as shown in FIG. 8, the impact force towards a left side direction in FIG. 8, that is, the first radial direction R1 can be applied to the driving member 33 such that the driving member 33 instantaneously pushes the second pad end 323 of the peeling pad 32 up.

Figure 9:
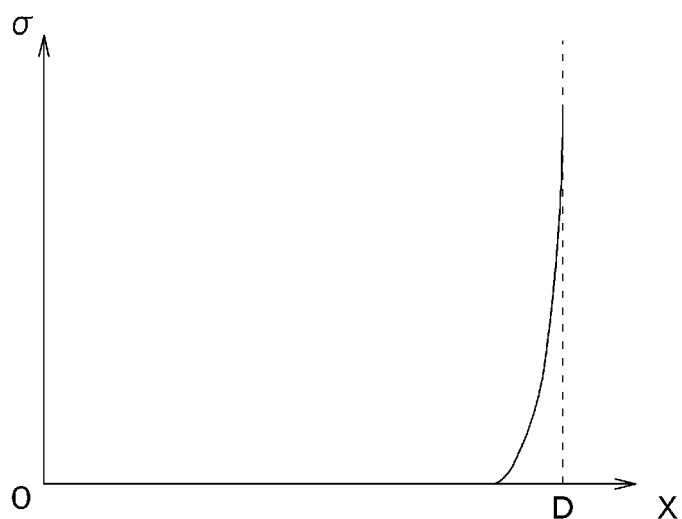
FIG. 9 is a diagram showing a stress distribution inside an ingot according to the manufacturing method shown in FIG. 8.

As shown in FIG. 9, according to the peeling method of the present embodiment, instantaneous tensile stress due to the impact force is concentrated to the first end 25. Thus, the peeling load can be further lowered. Also, the surface roughness of the peeled cross-section can be reduced. Therefore, according to the present embodiment, the processing ease and the manufacturing yield can be improved.

Summary of Embodiments

In the above-described respective embodiments, advantageous features are present in the amount of load, an area to which force is applied and a duration for which the force is applied compared to the comparative example. In other words, according to the above-described first embodiment and the third embodiment, the amount of load, and the area to which force is applied are smaller than that of the comparative example. Also, according to the above-described first to third embodiments, the amount of load and the duration for which the force is applied are smaller than that of the comparative example. Thus, according to the first to third embodiments, the amount of load and the force necessary for the peeling step can be reduced.

Modification Example

The present disclosure is not limited to the above-described embodiments. Therefore, the above-described embodiments can be appropriately modified. Hereinafter, typical modification examples will be described. In the following modification examples, configurations different from those in the above-described embodiments will mainly be described. In the above-described embodiments and modifications examples below, the same reference numbers are applied to mutually the same or equivalent portions. Hence, in the explanation of the modification examples below, for the constituents having the same reference numbers as those in the above-described embodiments, explanations of the above-described embodiments will be appropriately applied as long as technical inconsistency or any additional explanations are not present.

The present disclosure is not limited to a case where the semiconductor wafer 10 and the ingot 20 are constituted of SiC semiconductor. That is, the present disclosure may preferably be applied to the semiconductor wafer 10 and the ingot 20 constituted of materials of Si, SiN, AlN and the like, for example. Also, the present disclosure is not limited to specific apparatus configurations represented in the above-described embodiments. For example, FIG. 2 or the like is a simplified diagram for explaining the peeling apparatus 30 used for the present disclosure and an overall manufacturing method of the semiconductor wafer capable of being embodied using the peeling apparatus 30. Hence, the configuration of the peeling apparatus 30 which will be actually manufactured and sold is not limited to the configuration exemplified in FIG. 2 or the like. Further, the configuration of the peeling apparatus 30 which will be actually manufactured and sold may be appropriately modified from the configuration exemplified in FIG. 2 or the like. Specifically, for example, a method of fixing the ingot 20 on the supporting table 31 and the peeling pad 32 is not limited to use the adsorption described in the above-described embodiments, but may use adhesion, adhesive tape or the like, for example. In this case, the upper surface of the supporting table 31 (i.e. supporting suction surface 311 in the above-described embodiments) can be formed as a fixed surface or a support surface to fix or support the ingot 20. Note that suction holes in the above-described embodiments may not be provided on the fixed surface or the support surface. Moreover, wavelength of the laser beam is not limited to the above-described specific examples.

Figure 10:
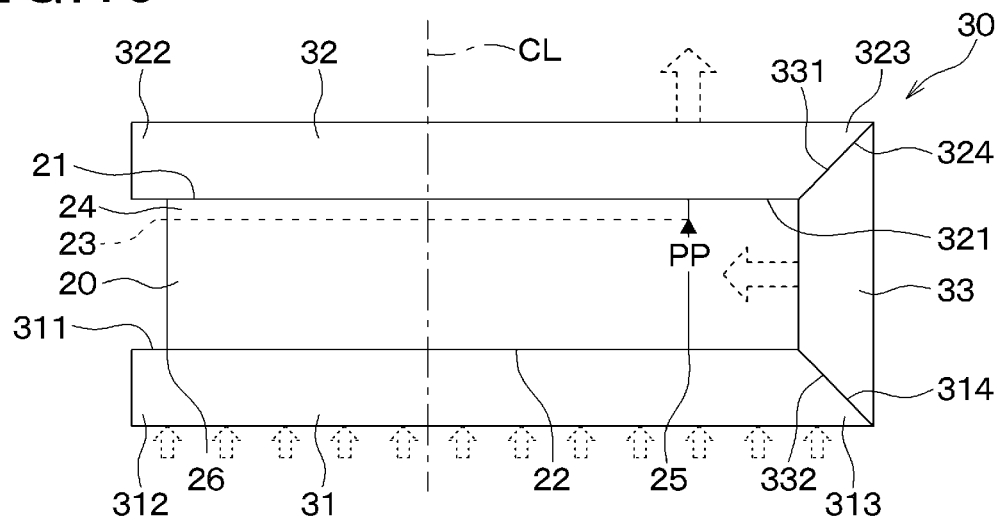
FIG. 10 is an overall diagram showing a manufacturing method of a semiconductor wafer according to yet another embodiment of the present disclosure.

In the above-described first to third embodiments, as shown in FIG. 10, ultrasonic vibrations may be applied to the ingot 20. Specifically, for example, the supporting table 31 and/or the peeling pad 32 may be excited by ultrasonic vibrations. Thus, peeling can preferably be promoted for the wafer precursor 24 in the peeling step.

Figure 11:
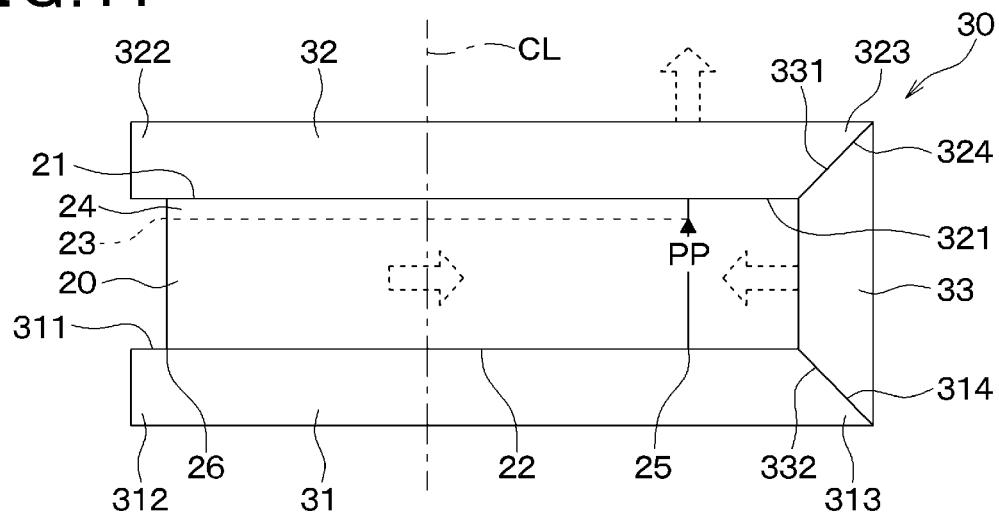
FIG. 11 is an overall diagram showing a manufacturing method of a semiconductor wafer according to yet another embodiment of the present disclosure.

In the above-described first to third embodiments, as shown in FIG. 11, a twist force may be applied to the ingot 20 such that the first major surface 21 and the second major surface 22 relatively rotate around the center axis CL. Thus, peeling can preferably be promoted for the wafer precursor 24 in the peeling step. Note that ultrasonic vibration and the twist force can be mutually superposed.

In the above-described embodiments, elements constituting the embodiments are not necessarily required except where elements are clearly specified as necessary or theoretically necessary. Even in the case where numeric values are mentioned in the above-described embodiments, such as the number of constituents, numeric values, quantity, range or the like, it is not limited to the specific values unless it is specified as necessary or theoretically limited to specific numbers. In the case where shapes, directions, positional relationships are mentioned for the constituents in the above-described embodiments, it is not limited to the shapes, the directions and the positional relationships except that they are clearly specified as necessary or theoretically limited to specific shapes, directions positional relationships and the like.

The modification examples are not limited to the above-described examples. For example, other than the above-described examples, a plurality of embodiments may be combined with each other as long as no technical inconsistency is present. Similarly, a plurality of modifications may be combined with each other as long as no technical inconsistency is present.

CONCLUSION

As described, the present disclosure has been achieved in light of the above-exemplified circumstances. In other words, the present disclosure provides a technique in which the processing quality and the processing ease are improved in the peeling step where wafers are peeled off from the ingot.

A method of manufacturing semiconductor wafers according to a first aspect of the present disclosure includes steps of: preparing an ingot (20) having a first major surface (21) and a second major surface (22) in a back side of the first major surface, a peeling layer (23) being formed in the ingot along the first major surface; and applying a load to the ingot from outside thereof with respect to a surface direction along the first major surface such that a moment with a supporting point (PP) which is a first end of the ingot in the surface direction acts on the ingot, and/or applying a dynamic force to the ingot such that a tensile stress along an ingot thickness direction acts on an entire area of the ingot in the surface direction, the ingot thickness direction defining a thickness of the ingot, connecting the first major surface and the second major surface and being parallel to a center axis (CL) of the ingot, thereby peeling a wafer precursor (24) from the ingot, the wafer precursor being formed in a layer-shape between the first major surface and the peeling layer.

What is claimed is:

1. A method of manufacturing semiconductor wafers, the method comprising steps of:
   preparing an ingot having a first major surface and a second major surface in a back side of the first major surface, a peeling layer being formed in the ingot along the first major surface; and
   applying a load to the ingot from outside thereof with respect to a surface direction along the first major surface such that a moment with a supporting point which is a first end of the ingot in the surface direction acts on the ingot, and/or
   applying a dynamic force to the ingot such that a tensile stress along an ingot thickness direction acts on an entire area of the ingot in the surface direction, the ingot thickness direction defining a thickness of the ingot connecting the first major surface and the second major surface and being parallel to a center axis of the ingot, thereby peeling a wafer precursor from the ingot, the wafer precursor being formed in a layer-shape between the first major surface and the peeling layer, wherein
   a first supporting part and a second supporting part are provided to support the ingot such that the first supporting part supports an entire surface of the first major surface and the second supporting part supports an entire surface of the second major surface.

2. The method of manufacturing semiconductor wafers according to claim 1, wherein
   the method further comprises steps of:
   fixing the first major surface of the ingot on a peeling pad and fixing the second major surface of the ingot on a supporting table; and
   applying a static load where a force point is at an end portion of the peeling pad positioned in one side in the surface direction such that the moment acts on the ingot in which the supporting point is the first end of the ingot positioned in one side in the surface direction, thereby peeling the wafer precursor from the ingot.

3. The method of manufacturing semiconductor wafers according to claim 1, wherein
   the method further comprises steps of:
   fixing the first major surface of the ingot on a peeling pad and fixing the second major surface of the ingot on a supporting table; and
   applying the dynamic force where a force point is at an end portion of the peeling pad positioned in one side in the surface direction such that the moment and the tensile stress act on the ingot in which the supporting point is the first end of the ingot positioned in one side in the surface direction, thereby peeling the wafer precursor from the ingot.

4. The method of manufacturing semiconductor wafers according to claim 2, wherein the method further comprises a step of:

pressing the end portion of the peeling pad with a driving member, thereby peeling the wafer precursor from the ingot, the driving member being driven in a radial direction and/or the ingot thickness direction, the radial direction being parallel to the surface direction, along a virtual linear line passing through the center axis.

5. The method of manufacturing semiconductor wafers according to claim 1, wherein the method further comprises steps of:

fixing the first major surface of the ingot on a peeling pad and fixing the second major surface of the ingot on a supporting table; and applying the dynamic force to the peeling pad and/or the supporting table in a direction mutually separating the supporting table and the peeling pad, thereby peeling the wafer precursor from the ingot.

6. The method of manufacturing semiconductor wafers according to claim 1, wherein the method further comprises a step of:

applying ultrasonic vibration together with the load and/or the dynamic force to the ingot.

7. The method of manufacturing semiconductor wafers according to claim 1, wherein the method further comprises a step of:

applying a twist force together with the load and/or the dynamic force to the ingot, the twist force relatively rotating the first major surface and the second major surface around the center axis.

8. The method of manufacturing semiconductor wafers according to claim 1, wherein the peeling layer is formed by laser radiation.

9. The method of manufacturing semiconductor wafers according to claim 8, wherein the peeling layer is formed by radiating a laser beam or a pulse laser beam each having a wavelength having a transparency to the ingot.

10. The method of manufacturing semiconductor wafers according to claim 1, wherein the ingot is made of SiC.

* * * * *